US012451034B1

(12) United States Patent
Prasad

(10) Patent No.: US 12,451,034 B1
(45) Date of Patent: Oct. 21, 2025

(54) WIND-DRIVEN POSTER DISPLAY SYSTEM

(71) Applicant: Birendra Prasad, Redondo Beach, CA (US)

(72) Inventor: Birendra Prasad, Redondo Beach, CA (US)

( * ) Notice: Subject to any disclaimer, the term of this patent is extended or adjusted under 35 U.S.C. 154(b) by 0 days.

(21) Appl. No.: 19/217,499

(22) Filed: May 23, 2025

(51) Int. Cl.
*G09F 15/00* (2006.01)
*G09F 13/18* (2006.01)

(52) U.S. Cl.
CPC .......... *G09F 15/0087* (2013.01); *G09F 13/18* (2013.01); *G09F 15/0081* (2013.01); *G09F 2013/1845* (2013.01); *G09F 2013/1881* (2013.01)

(58) Field of Classification Search
CPC .. G09F 15/0087; G09F 13/18; G09F 15/0081; G09F 2013/1845; G09F 2013/1881
See application file for complete search history.

(56) References Cited

U.S. PATENT DOCUMENTS 5,953,841 A * 9/1999 Sawyer ............... G09F 15/0087 40/484
2003/0029066 A1 * 2/2003 Venn ................... G09F 15/0056 40/493
2008/0236009 A1 * 10/2008 Venn ................... G09F 15/0087 40/606.12
2009/0086465 A1 * 4/2009 St-Germain ........ G09F 15/0087 362/89
2015/0107142 A1 * 4/2015 Burrous .................. G09F 13/18 40/714
2015/0228211 A1 * 8/2015 Curic ...................... G09F 13/10 40/541

* cited by examiner

*Primary Examiner* — Gary C Hoge
(74) *Attorney, Agent, or Firm* — Invention To Patent Services; Alex Hobson

(57) ABSTRACT

A wind-driven poster display system enables quick insertion of a poster display and rotates the poster display to catch the attention of people in the area or passing by. A wind-driven poster display employs a rotor assembly coupled to a stator assembly having a foundation base. The rotor assembly, including the poster mounting frame, rotates about the stator assembly via a bearing that is coupled between the stator assembly and rotor assembly by a stator-rotor coupling assembly. The poster mounting frame rotates via wind, wherein the poster mounting frame has a wind-capture mechanisms, wing blades extending from each of the respective left extension and right extension of the poster mounting frame, in opposing directions. When the wind blows, the wing blades catch the wind and cause the poster mounting frame to spin to expose a first surface and subsequently a second surface of the poster mounting frame.

18 Claims, 9 Drawing Sheets

WIND-DRIVEN POSTER DISPLAY SYSTEM

BACKGROUND OF THE INVENTION

Field of the Invention

The invention relates to a wind-driven poster display system comprising a stator assembly and a rotor assembly configured to rotate about the stator assembly's axis of rotation and comprising a top extension slot for receiving and interchanging posters therein with communication and/or advertisements thereon.

Background

Capturing attention in our fast-paced world is becoming more difficult with all the distractions. Traditional static posters often fade into the background, becoming just another part of the scenery that people pass by without a second glance. They are stationary, not interactive, and in an age where dynamic content is king, they simply don't cut it anymore.

Then there was the introduction of electronic displays that are bright, flashy, and eye-catching. Sure, they can grab attention, but they come with their own set of problems. They're energy hogs, relying heavily on electricity, which not only racks up higher operating costs but also isn't exactly a friend to the environment. Think about all that power consumption and the carbon footprint that follows.

Moreover, electronic displays require regular maintenance and an electrical inputs or source. They're packed with components that can fail, screens that glitch, circuits that fry, and software that crashes. Plus, in outdoor settings, they're exposed to the elements, which can shorten their lifespan and lead to even more frequent repairs or replacements.

These limitations highlight a clear problem: there's a lack of sustainable, cost-effective, and engaging advertising solutions that can operate independently of the electrical grid. This gap becomes even more pronounced in rural areas where access to electricity is limited or nonexistent, yet the need for effective communication remains.

Existing mechanical displays are not effective advertisement tools, as they often rely on someone to physically change or move them, or they use complex mechanisms that are costly and prone to breakdowns. They don't offer the simplicity or reliability needed for widespread day and night adoption.

SUMMARY OF THE INVENTION

A wind-driven poster display system enables quick insertion of a poster display, such as an advertisement, and rotates the poster display to catch the attention of people in the area or passing by. A wind-driven poster display employs a rotor assembly coupled to a stator assembly having a foundation base. The rotor assembly, including the poster mounting frame, rotates about the stator assembly via a bearing that is coupled between the stator assembly and rotor assembly by a stator-rotor coupling assembly that couples the foundation rod with the poster mounting frame. The foundation rod is fixed to the foundation base and does not rotate while the bearing enables the poster mounting frame to rotate via wind, wherein the poster mounting frame has a wind-capture mechanisms, wing blades extending from each of the respective left extension and right extension of the poster mounting frame, in opposing directions. When the wind blows, the wing blades catch the wind and cause the poster mounting frame to spin to expose a first surface and subsequently a second surface of the poster mounting frame. The wing blades enable the poster mounting frame to rotate even with light winds.

The poster mounting frame is configured to easily receive and retain a poster, a planar panel, that slides into the poster mounting frame through a top extension slot in the top extension and along side extension U-channels in each of the left-side and right extensions. The insertion end of the poster is retained on the bottom extension, which may also have a U-channel to retain the insertion end to the poster mounting frame.

The foundation base has a base extension radius that may be effectively large to prevent the wind-driven poster display from blowing over due to high wind velocities and may be about 0.25 m or more, about 0.35 m or more, about 0.5 m or more, or even about 0.75 m or less, or any range between and including the values provided, such as from about 0.25 m to about 0.75 m. The foundation base may be made of a heavy material, such as metal, to further prevent blowing over due to high winds.

The poster mounting frame has a height and width effectively large to receive a poster within the window between the top, bottom and side extensions that will be legible by pedestrians walking by and by motorist as they drive by the wind-driven poster display configured on a curb or sidewalk, or in front of a place of business. The height may be about 0.25 m or more about 0.35 m or more, about 0.5 m or more, about, 1 m or more, about 1.25 m or more, or even about 1.5 m, about 1.75 or more, about 2.0 m or more or less, or any range between and including the values provided, such as from about 0.35 m to about 2.0. Likewise, the width may be about 0.15 m or more about 0.25 m or more, about 0.35 m or more, about 0.5 m or more, about 0.75 m or more, about 1 m or more, about 1.25 or more, about 1.5 m or more, about 2.0 m or more or less, or any range between and including the values provided, such as from about 0.25 m to about 2.0. It may be preferred that the width be less than the height, or a fraction of the height, such as about 0.8 the height or less, about 0.75 the height or less, about 0.65 the height or less, about 0.5 the height or less, and any range between and including the fractions provided.

The poster has a first surface and an opposing second surface, and the same or different messages, pictures, drawings and/or designs may be on the opposing sides. The poster is planar, having consistent thickness between the first surface and the second surface and a width from a first side to a second side and length from the insertion end to the upper end, configured to fit within the channels of the poster mounting frame. The first surface of the poster is configured on the first surface of the poster mounting frame, and the second surface of the poster is configured on the second surface of the poster mounting frame. A stator-rotor coupling assembly includes a support arm rod coupling, an aperture in the support arm plate that receives the rod extended end therein or therethrough, and fasteners, such as bolts, that extend through the arm plate apertures and through the bearing plate apertures to secure the bearing to the poster mounting frame. The foundation rod extends through the bearing shaft aperture to retain the foundation rod and stator assembly to the bearing.

A speed-set screw may extend through the support arm plate and screw onto an exterior surface of the foundation rod. Also, one or more speed-set screws and may be provided, such as one on each side of the support arm plate to control the rotational speed of the rotor assembly. Depending upon the wind speed on a certain day or night, and the desired outcome, one or both speed-set screws can be tightened or loosened to control the rotational speed of the poster display system.

The wing blades extend in opposing directions from the left extension and right extension of the poster mounting frame. Each wing blade has a first extension portion that extends a first extension length along a first extension length axis from the poster mounting frame at a first offset angle, the included angle from the poster frame width axis, and a second extension portion, extending a second extension length along the second extension length axis from the extended end of the first extension portion at a second offset angle, an included angle with respect to the first extension length axis of the first extension portion. The first extension offset angle may be about 45 degrees or more, about 65 degrees or more, about 75 degrees or more, about 85 degrees or more, or even up to about 90 degrees of more, and any range between and including the angles provided. The second extension offset angle may be about 165 degrees or less, about 150 degrees or less, about 135 degrees or less, about 115 degrees or less or even about 90 degrees or less, and any range between and including the angles provided. The second extension offset angle may preferably be more than 90 degrees or even 115 degrees to prevent too much force on the poster mounting frame. Also, the first extension portion may extend linearly from the coupled end to the extended end, and the second extension portion may also extend linearly from the coupled end to the extended end.

An aerodynamic wing blade extends from each of the left extension and right extension, as used herein, for clarity of explanation, but also considered a first and second extension, respectively, as the poster mounting frame rotates. Each of the aerodynamic wing blade has a first extension portion that extends from a coupled end, coupled to the poster mounting frame, and more particularly to the side extension of poster mounting frame to an extended end and a second extension portion that extends from the coupled end, coupled to the extended end of the first extension portion, to an extended end. The wing blades may be contiguous with the side extension and may be formed from a single piece of material, wherein the side extension and or the U-channel and the respective wing blade are monolithic. As shown, the side extension and the wing blade are formed by a single bent piece of metal, a sheet of material that is effectively strong enough for the applications, The left extension includes a U-channel, and the wing blade may extend from this U-channel. The wing blade and the U-channel may be a monolithic piece and be formed by a sheet of bent metal. The right extension also includes a U-channel, and the wing blade may extend from this U-channel. The wing blade and the U-channel may be a monolithic piece and be formed by a sheet of bent metal. The poster may be captured in this U-channel as well.

The top extension slot extends into the U-channel of the left extension and the U-channel of the right extension to form a closed-ended slot for receiving and retaining the poser. The wing blades extend from the left and right extensions in opposing directions, or one out from a first surface and the other from the second surface of the poster or poster mounting frame.

A poster mounting frame, or rotor assembly, is coupled to the foundation rod of the stator assembly by the stator-rotor coupling that includes a support arm bearing, such as a pillow-block bearing, coupled to both the foundation rod and the support arm plate of the poster mounting frame. The support arm plate is a portion of the bottom extension of the poster mounting frame that may be recessed down by base extension bends in the bottom extension to enable the poster board to extend across the bottom extension without interference from the rotor-stator fasteners and or the extended end of the foundation rod. The bearing, such as a pillow-block bearing, has a bearing plate with bearing plate apertures or receiving a rotor-stator fastener to secure the bearing to the poster mounting frame. The rotor-stator fastener extends through the respective arm plate apertures in the support arm plate. Also, the bearing has a bearing shaft-sleeve portion with a bearing shaft aperture for receiving the foundation rod therein or therethrough as shown. A bearing shaft-sleeve aperture extends through the bearing shaft-sleeve portion to receive a screw to secure the bearing shaft-sleeve portion to the foundation rod. This assembly enables the poster mounting frame to rotate about the foundation rod.

The stator-rotor coupling includes a bearing, such as a pillow block bearing, having a bearing plate, and a bearing shaft-sleeve separated by a bearing portion. The bearing shaft-sleeve has a bearing shaft aperture for the foundation rod, and the bearing plate has apertures for coupling to the support arm plate.

The foundation rod extends through the support arm rod coupling, an aperture in the support arm plate, and the stator-rotor coupling assembly secures the poster mounting frame to the foundation rod.

The wind-driven poster display system may include a light device or a lighting assembly having a light device, such as a light emitting diode, or plurality of light devices. Also, the wind-driven poster display system may include a photovoltaic cell configured to power the light devices. The light devices and/or a photovoltaic cell may be coupled to the rotor assembly such as to the poster mounting frame or the wing blades. The light device or light devices may be configured along the inside surface of the first extension portion and/or second extension portion of the wing blade or wing blades to effectively illuminate a poster retained in the poster mounting frame. With the light device configured on an inside surface of the aerodynamic wing blades, the light would project onto the poster due to the acute first offset angle and furthermore due to the second offset angle. A light device on the second extension portion, such as on the inside surface would have an emitted light with a light axis (normal to the plane of the respective first or second extension portion) that would intercept with the window of the poster mounting frame or poster configured therein. The wing blades and particularly the second extension portion may be well suited for placement of a light device.

The summary of the invention is provided as a general introduction to some of the embodiments of the invention and is not intended to be limiting. Additional example embodiments, including variations and alternative configurations of the invention, are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
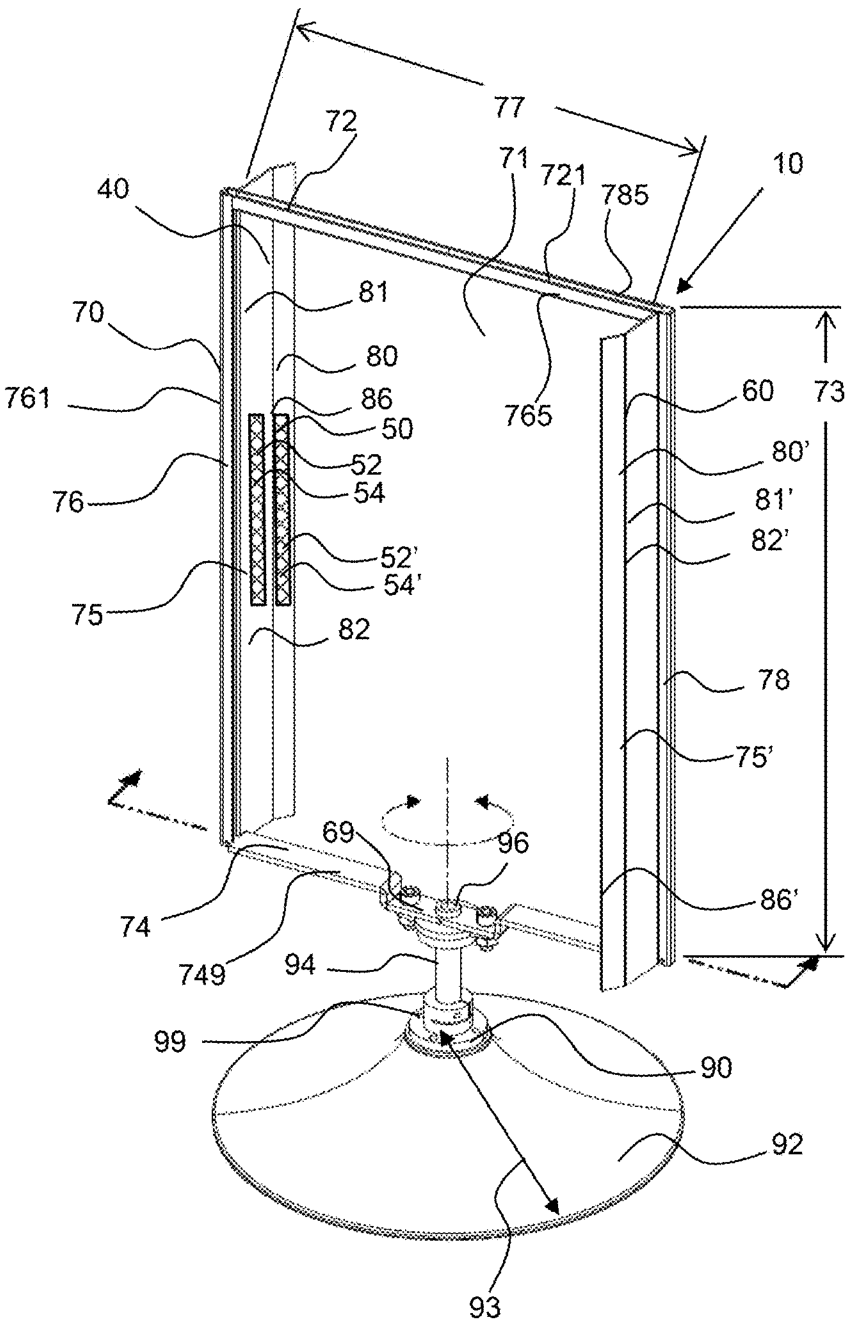
FIG. 1 shows a perspective view of the wind-driven poster display system comprising a rotor assembly coupled to a stator assembly having a foundation base.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, the use of "a" or "an" is employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

Figure 2:
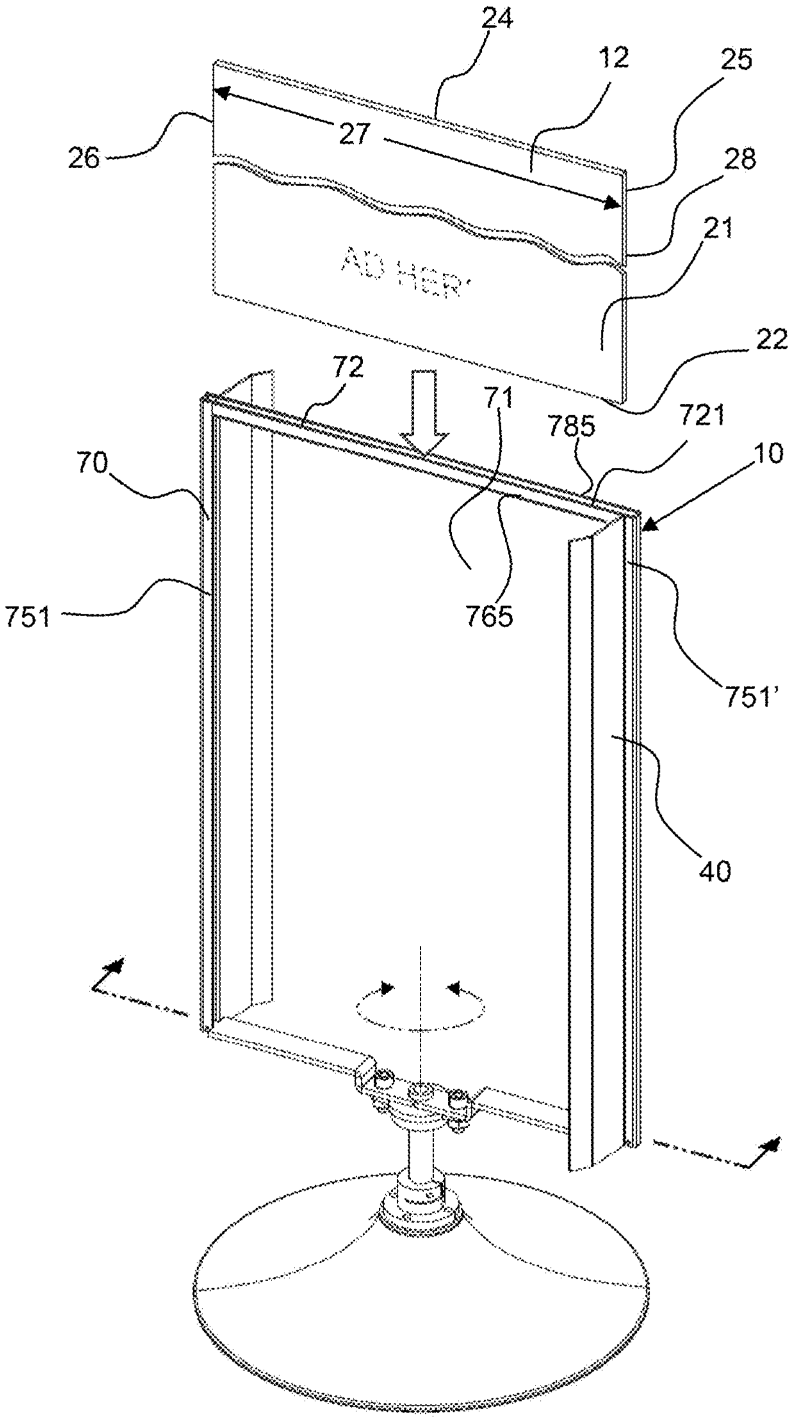
FIG. 2 shows a perspective view of the wind-driven poster display system and an advertising panel being inserted into the poster mounting frame of the rotor assembly.

Referring now to FIGS. 1 and 2, the wind-driven poster display system 10 includes a wind-driven poster display 40 that employs a rotor assembly 60 coupled to a stator assembly 90 having a foundation base 92. The rotor assembly including the poster mounting frame 70, rotates about the stator assembly via a bearing that is coupled between the stator assembly and rotor assembly by a stator-rotor coupling assembly 96 that couples the foundation rod 94 with the poster mounting frame 70. The foundation rod is fixed to the foundation base and does not rotate while the bearing enables the poster mounting frame 70 to rotate via wind, wherein the poster mounting frame has a wind-capture mechanisms 80, wing blades 81, 81' extending from each of the respective left extension 76 and right extension 78 of the poster mounting frame, in opposing directions. When the wind blows, the wing blades catch the wind and cause the poster mounting frame 70 to spin to expose a first surface 765 and subsequently a second surface 785 of the poster mounting frame.

The poster mounting frame 70 is configured to easily receive and retain a poster 12, a planar panel, that slides into the poster mounting frame through a top extension slot 721 in the top extension 72 and alongside extension U-channels in each of the left-side and right extensions. The insertion end 22 of the poster 12 is retained on the bottom extension 74, which may also have a bottom extension U-channel 749 to retain the insertion end 22 to the poster mounting frame 70.

As shown in FIG. 1, the foundation base 92 has a base extension radius 93 that may be effectively large to prevent the wind-driven poster display 40 from blowing over due to high wind velocities and may be about 0.25 m or more, about 0.35 m or more, about 0.5 m or more, or even about 0.75 m or less, or any range between and including the values provided, such as from about 0.25 m to about 0.75 m. The foundation base may be made of a material that is heavy to further prevent blowing over due to high winds.

As shown in FIG. 1, the poster mounting frame 70 has a height 73 and width 77 effectively large to receive a poster within the window 71 (shown in FIG. 2) between the top, bottom and side extensions that will be legible by pedestrians walking by and by motorist as they drive by the wind-driven poster display configured on a curb or sidewalk or in front of a place of business. The height 73 may be about 0.25 m or more about 0.35 m or more, about 0.5 m or more, about 1 m or more, about 1.25 m or more, or even about 1.5 m, about 1.75 or more, about 2.0 m or more or less, or any range between and including the values provided, such as from about 0.35 m to about 2.0. Likewise, the width may be about 0.15 m or more about 0.25 m or more, about 0.35 m or more, about 0.5 m or more, about 0.75 m or more, about 1 m or more, about 1.25 or more, about 1.5 m or more, about 2.0 m or more or less, or any range between and including the values provided, such as from about 0.25 m to about 2.0.

It may be preferred that the width be less than the height, or a fraction of the height, such as about 0.8 the height or less, about 0.75 the height or less, about 0.65 the height or less, about 0.5 the height or less and any range between and including the fractions provided.

Figure 7:
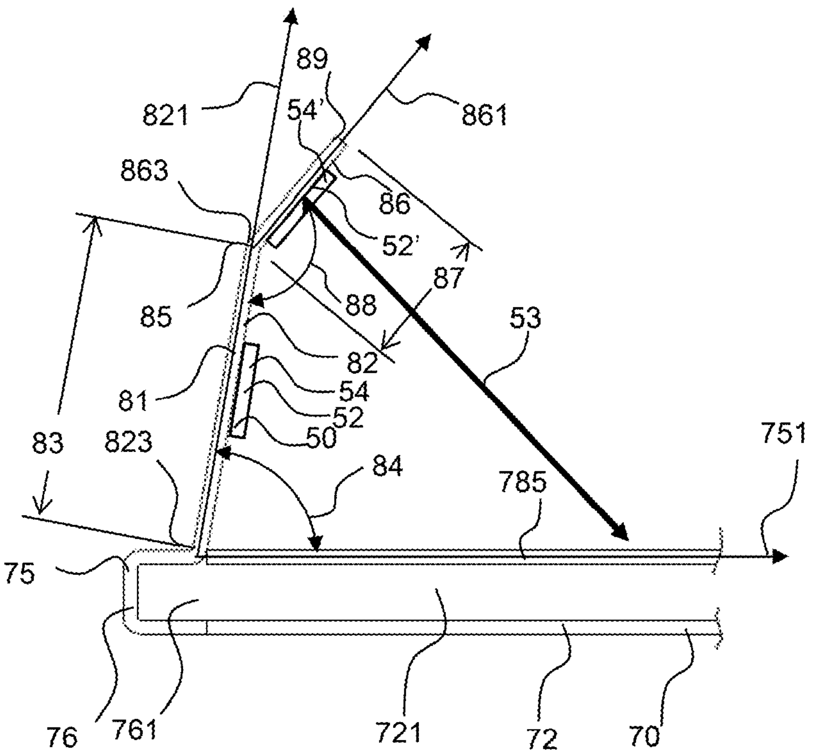
FIG. 7 shows an enlarged top view of a portion of the poster mounting frame shown in FIG. 6 and the first extension portion and second extension portion of the wing blade extending from the left extension of the poster mounting frame.
Figure 8:
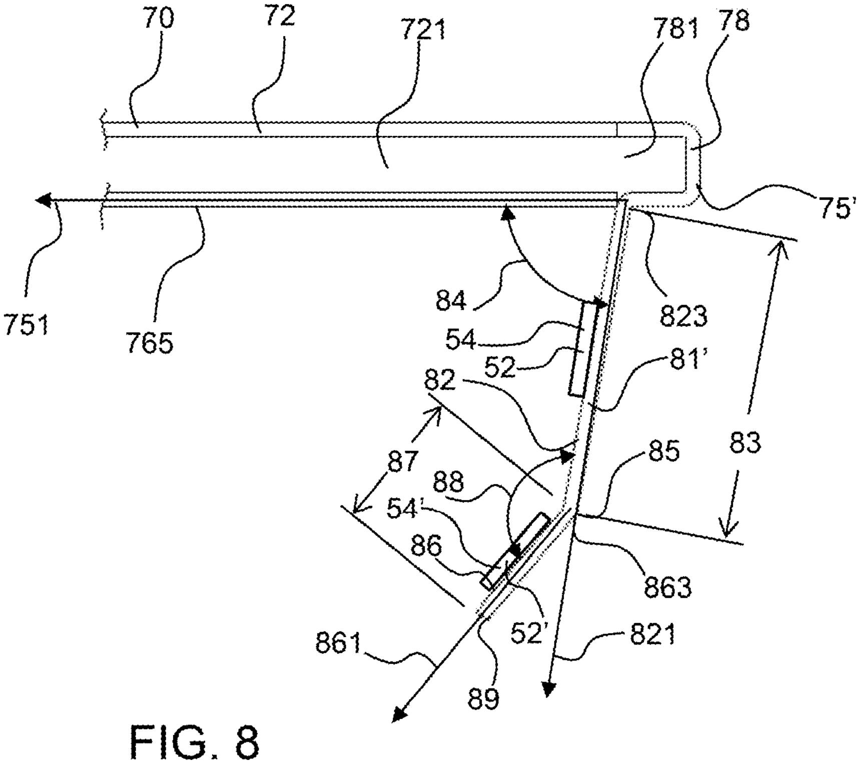
FIG. 8 shows an enlarged top view of a portion of the poster mounting frame shown in FIG. 6 and the first extension portion and second extension portion of the wing blade extending from the right extension of the poster mounting frame.

As shown in FIG. 1 and FIG. 7, the wind-driven poster display system 10 includes a lighting assembly 50 having a light device 52, such as a light emitting diode, or plurality of light devices as shown, and a photovoltaic cell 54 configured to power the light devices. The photovoltaic cell 54 may be coupled to the rotor assembly such as to the poster mounting frame or the aerodynamic wing blades to power the light devices. The light device or light devices 52, 52' may also be configured on rotor assembly, such as to the poster frame and/or on the wing blades 81, such as along the inside surface of the first extension portion 82, and/or second extension portion 86. Similarly, as shown in FIG. 8, the lighting device 52, 52' may be configured on the aerodynamic wing blades 81, such as along the inside surface of the first extension portion 82, and/or second extension portion 86. With the light device configured on an inside surface of the aerodynamic wing blades, the light would project onto the poster due to the acute first offset angle 84 and furthermore due to the second offset angle. A light device on the second extension portion 86, such as on the inside surface would have an emitted light with a light axis 53 (normal to the plane of the respective first or second extension portion) that would intercept with the window or poster configured therein. The wing blades and particularly the second extension portion 86 may be well suited for placement of a light device.

A light device on a first aerodynamic wing blade, shown in FIG. 7 may effectively illuminate a second surface 785 of the poster mounting frame and a light device on the second aerodynamic wing blade, shown in FIG. 8, may effectively illuminate the first surface 765 of the poster or poster mounting frame. along the right-side of the wing blades illuminate a second-side of said poster (see FIG. 8). Each aerodynamic wing blade may have a light device on one or both of the first extension portion and second extension portion of the aerodynamic wing blade. A photovoltaic cell 54, 54' may be coupled with a light device, such as light device 52, 52' respectively to power the light device. The photovoltaic cell may be part of a light assembly that includes the light device and a photovoltaic cell or may be separate and have a coupling wire to provide power to the light device.

As shown in FIG. 2, the poster 12 has a first surface 21 and an opposing second surface 25 and the same or different messages, pictures, drawings and/or designs may be on the opposing sides. The poster is planar having consistent thickness between the first surface and the second surface and a width 27 from a first side 26 to a second side 28, and length from the insertion end 22 to the upper end 24 configured to fit within the channels of the poster mounting frame 70. The first surface 21 of the poster 12 is configured on the first surface 765 of the poster mounting frame 70, and the second surface 25 of the poster 12 is configured on the second surface 785 of the poster mounting frame.

Figure 3:
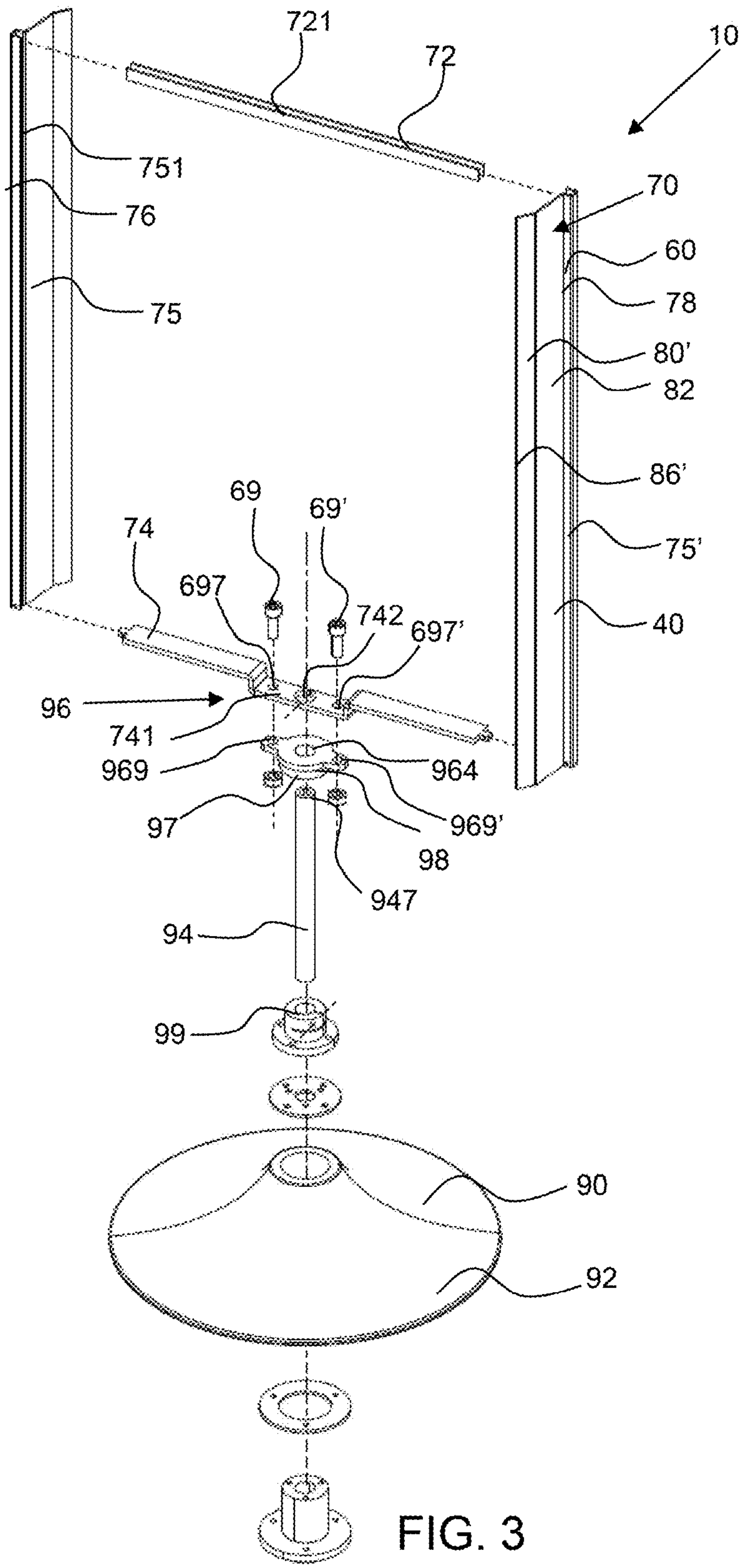
FIG. 3 shows a perspective exploded view of the wind-driven poster display system.

As shown in FIG. 3, a stator-rotor coupling assembly 96 includes a support arm rod coupling 742, an aperture in the support arm plate 741 that receives the rod extended end 947 therethrough and fasteners 69, 69', such as bolts, extend through the arm plate apertures 697, 697' respectively and through the bearing plate apertures 969, 969', respectively, to secure the bearing 97 to the poster mounting frame 70. One end of the foundation rod 94 extends through the bearing shaft aperture 964 to retain the foundation rod 94 and stator assembly 90 to the bearing 97. A bearing-rod set screw may extend through the interior bearing shaft-sleeve portion 965 of the bearing 97 and screw onto an exterior surface of the foundation rod 94. The other end of the foundation rod 94 extends to a rod foundation coupling 99 that couples the rod with the foundation base, wherein the rod foundation coupling may include a collar or sleeve and a mounting plate.

Referring now to FIGS. 4 to 8, the wing blades 81, 81' extend in opposing directions from the left extension 76 and right extension 78 of the poster mounting frame 70. As shown in FIGS. 7-8, each wing blade has a first extension portion 82 that extends a first extension length 83 along a first extension length axis 821 from the poster mounting frame at a first offset angle 84, the included angle from the poster frame width axis 751, and a second extension portion 86, extending a second extension length 87 along the second extension length axis 861 from the extended end 85 of the first extension portion at a second offset angle 88, an included angle with respect to the first extension length axis 821 of the first extension portion. The first extension offset angle may be about 45 degrees or more, about 65 degrees or more, about 75 degrees or more, about 85 degrees or more, or even up to about 90 degrees of more and any range between and including the angles provided. The second extension offset angle may be about 165 degrees or less, about 150 degrees or less, about 135 degrees or less, about 115 degrees or less or even about 90 degrees or less and any range between and including the angles provided. The second extension offset angle may preferably be more than 90 degrees or even 115 degrees to prevent too much force on the poster mounting frame. Also, the first extension portion 82 may extend linearly from the coupled end 823 to the extended end 85 and the second extension portion 86 may also extend linearly from the coupled end 863 to the extended end 89.

As shown in FIGS. 7 and 8 an aerodynamic wing blade 81, 81' extends from each of the left extension 76 and right extension 78. Each of the aerodynamic wing blade 81, 81' has a first extension portion 82 that extends at a first offset angle 84, from a coupled end 823, coupled to the poster mounting frame 70, and more particularly to the side extension of poster mounting frame 70 to an extended end 85 and a second extension portion 86 that extends from the coupled end 863, coupled to the extended end 85, at a second offset angle 88 from the first extension portion 82, to an extended end 89. The wing blades 81 81' may be contiguous with the side extension and may be formed from a single piece of material, wherein the side extension 75, 75', and or the U-channel 761, 781 and the respective wing blade 81, 81' are monolithic. As shown, the side extension and the wing blade are formed by a single bent piece of material, a sheet of material that is effectively strong enough for the applications, such as a sheet of metal, for example.

Figure 4:
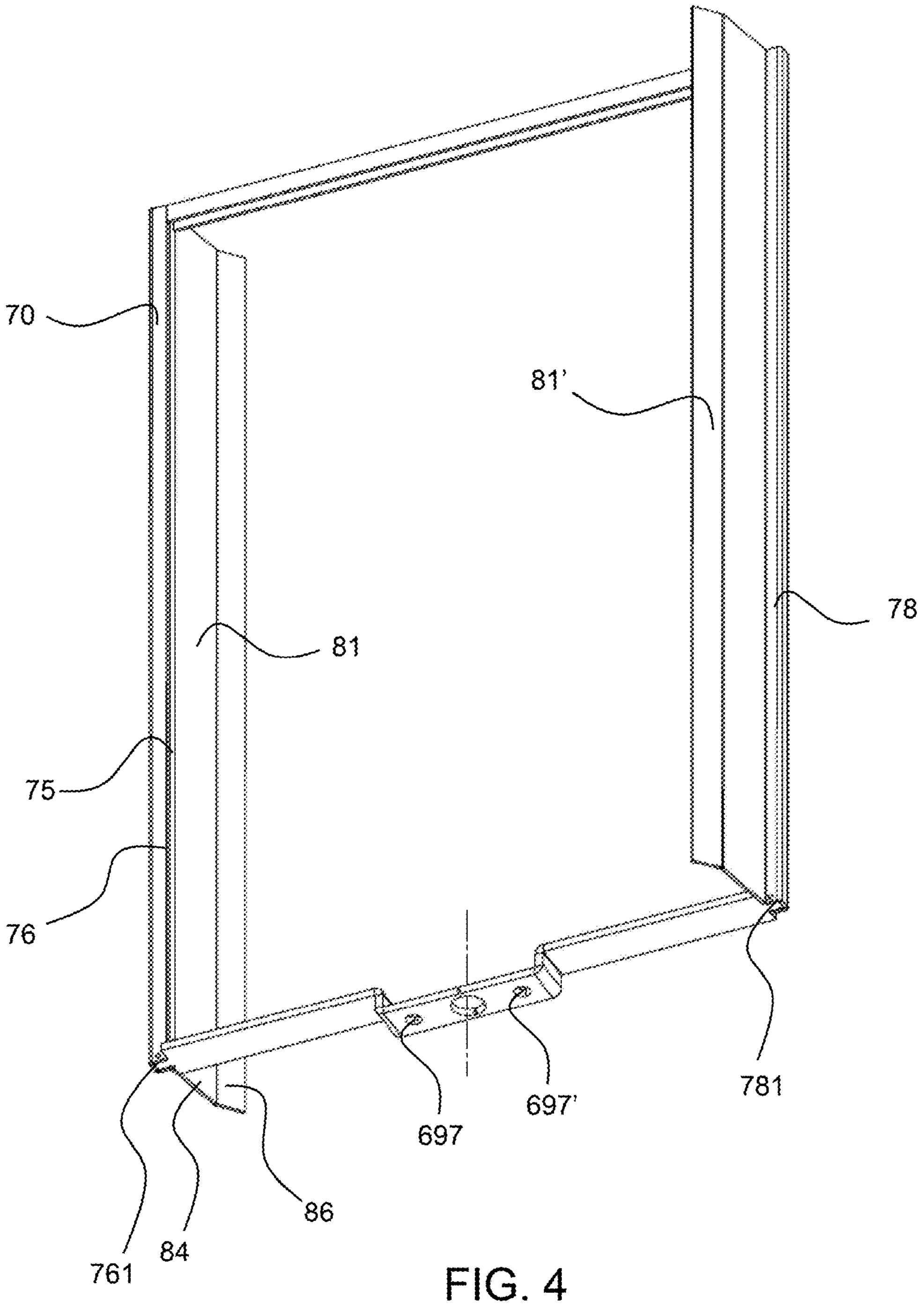
FIG. 4 shows a perspective view of the poster mounting frame having a wind capture portion including wing blades that extend from each of the left extension and right extension in opposing directions.
Figure 5:
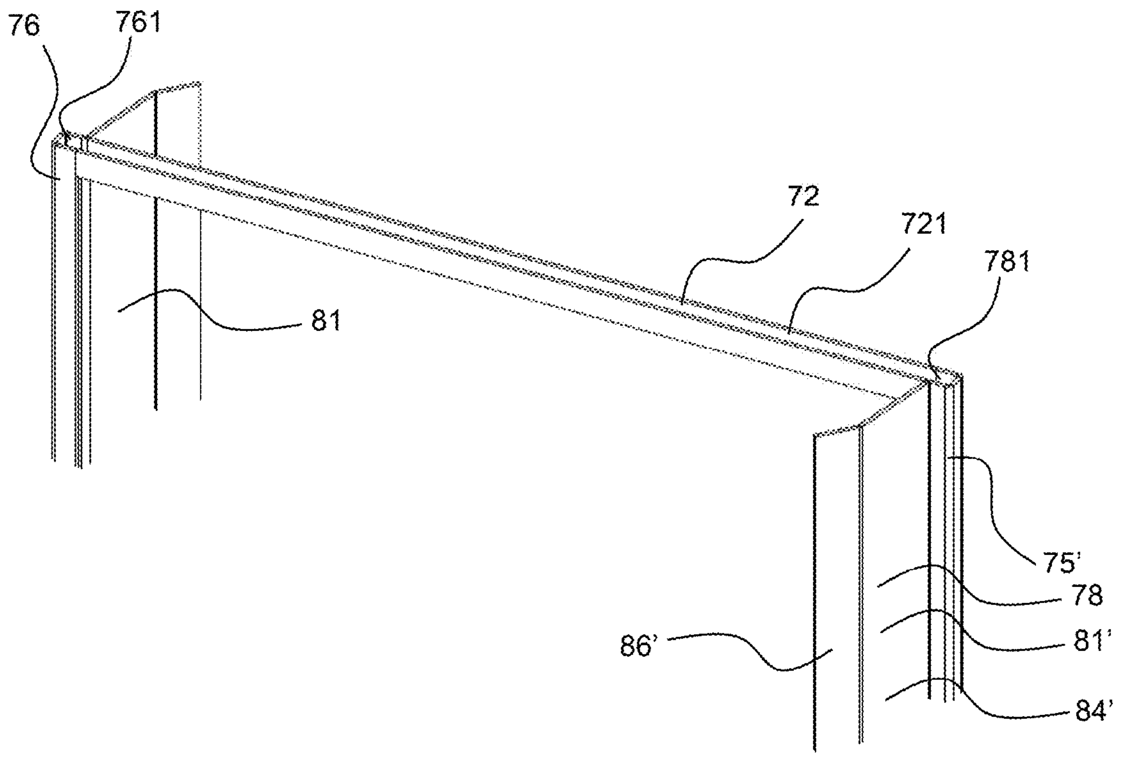
FIG. 5 shows a perspective view of a portion of the poster mounting frame and the wing blades extending from the left and right extensions in opposing directions.

Referring to FIG. 4, the left extension 76 includes a U-channel 761, and the wing blade 81 may extend from this U-channel. The wing blade 81 and the U-channel may be a monolithic piece and be formed by a sheet of bent metal. The right extension 78 also includes a U-channel 781, and the wing blade 81' may extend from this U-channel. The wing blade 81' and the U-channel may be a monolithic piece and be formed by a sheet of bent metal. As discussed herein, the poster may be captured in this U-channel as well.

Figure 6:
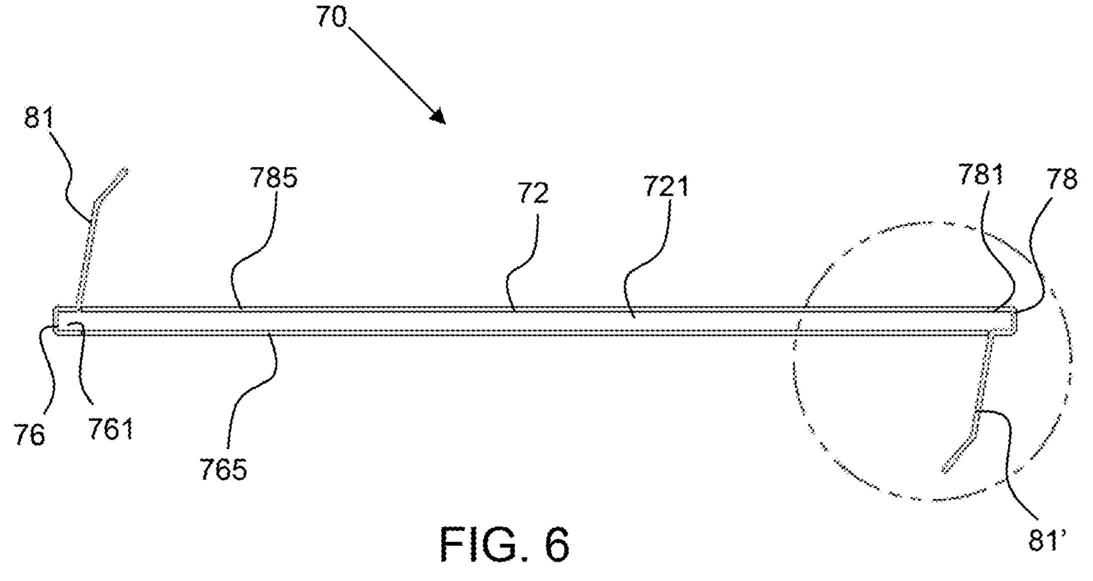
FIG. 6 shows a top view of the top portion of the poster mounting frame and the wing blades extending from the left and right extensions in opposing directions
Figure 9:
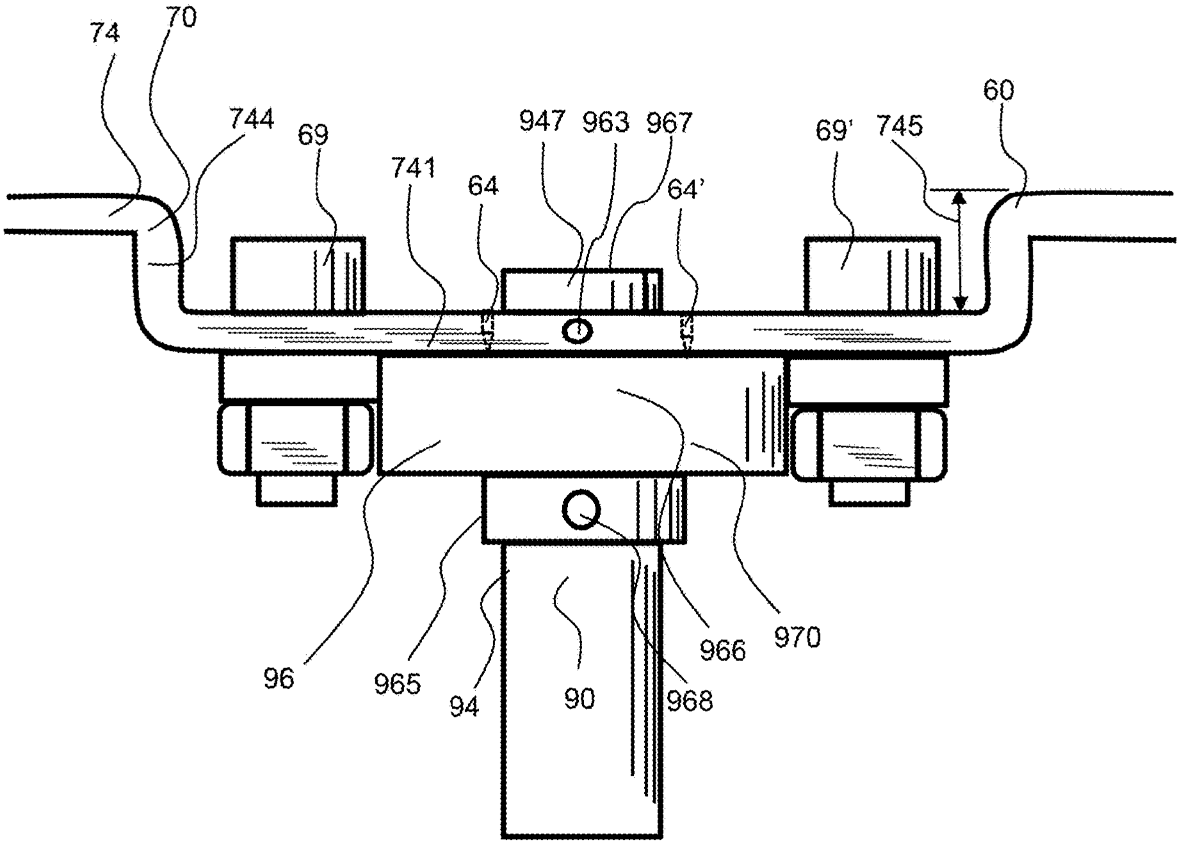
FIG. 9 shows a side view of a portion of the poster mounting frame and the stator-rotor coupling, including a support arm bearing coupled to both the foundation rod and the support arm plate of the poster mounting frame.
Figure 10:
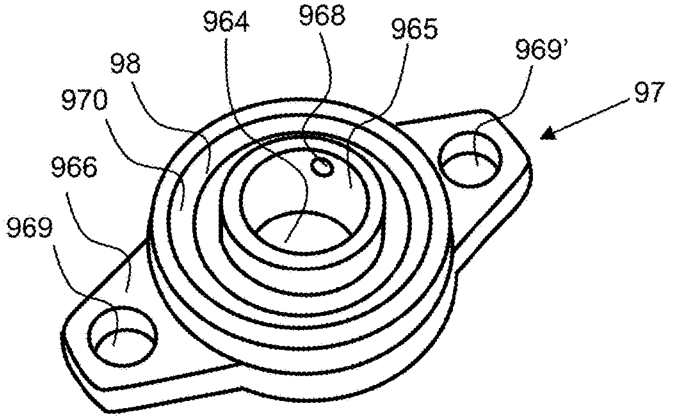
FIG. 10 shows a perspective view of the bearing, a pillow block bearing having a mounting plate portion with bearing coupling apertures on opposing sides for mounting to the support arm plate by fasteners.

As shown in FIG. 6, the top extension slot extends into the U-channel 761 of the left extension 76 and the U-channel 781 of the right extension 78 to form a closed-ended slot for receiving and retaining the poster. This view also shows how the wing blades 81, 81' extend from the left and right extensions in opposing directions Referring now to FIGS. 9 to 11, a poster mounting frame 70, or rotor assembly 60 is coupled to the foundation rod 94 of the stator assembly 90 by the stator-rotor coupling assembly 96 that includes a support arm bearing 97, such as a pillow-block bearing 98 coupled to both the foundation rod 94 and the support arm plate 741 of the poster mounting frame 70. The support arm plate 741 is a portion of the bottom extension 74 of the poster mounting frame 70 that may be recessed down by base extension bends 744 in the bottom extension 74 to produce a base extension offset distance 745 that enables the poster board to extend across the bottom extension without interference from the rotor-stator fasteners 69, 69' and or the rod extended end 947 of the foundation rod 94. As shown in FIG. 9, the bearing 97, such as a pillow-block bearing 98, has a bearing plate 966 with bearing plate apertures 969, 969' for receiving a rotor-stator fastener 69, 69' to secure the bearing 97 to the poster mounting frame 70. The rotor-stator fastener 69, 69' extend through respective arm plate apertures 697, 697' in the support arm plate 741. Also, the bearing has a bearing shaft-sleeve portion 965 with a bearing shaft aperture 964 for receiving the foundation rod 94 therein or therethrough, as shown in FIG. 10. A bearing shaft-sleeve aperture 968 extends through the bearing shaft-sleeve portion 965 to receive a screw to secure the bearing shaft-sleeve portion 965 to the foundation rod 94. This assembly enables the poster mounting frame 70 to rotate about the foundation rod 94.

As shown in FIG. 9, a pair of speed screws 963, 967 extend through the support arm plate 741, on opposing sides of the support arm, into the foundation rod 94 outer surface to produce friction and to control the speed of rotation for a given wind speed. On windy days, these speed screws may be tightened against the foundation rod 94 to slow the rotational speed, or revolutions per minute (RPM) of the rotor assembly. The bearing shaft-sleeve 965 is fixed to the foundation rod 94 and does not rotate with the rotor assembly. The bearing plate 966 is fixed to the support arm 70 and rotates with the rotor assembly.

As shown in FIG. 10, the stator-rotor coupling includes a bearing 97, such as a pillow block bearing 98, having a bearing plate 966, and bearing shaft-sleeve portion 965 separated by a bearing portion 970. The bearing shaft-sleeve portion 965 has a bearing shaft aperture 964 for the foundation rod and the bearing plate 966 has apertures for coupling to the support arm plate.

Figure 11:
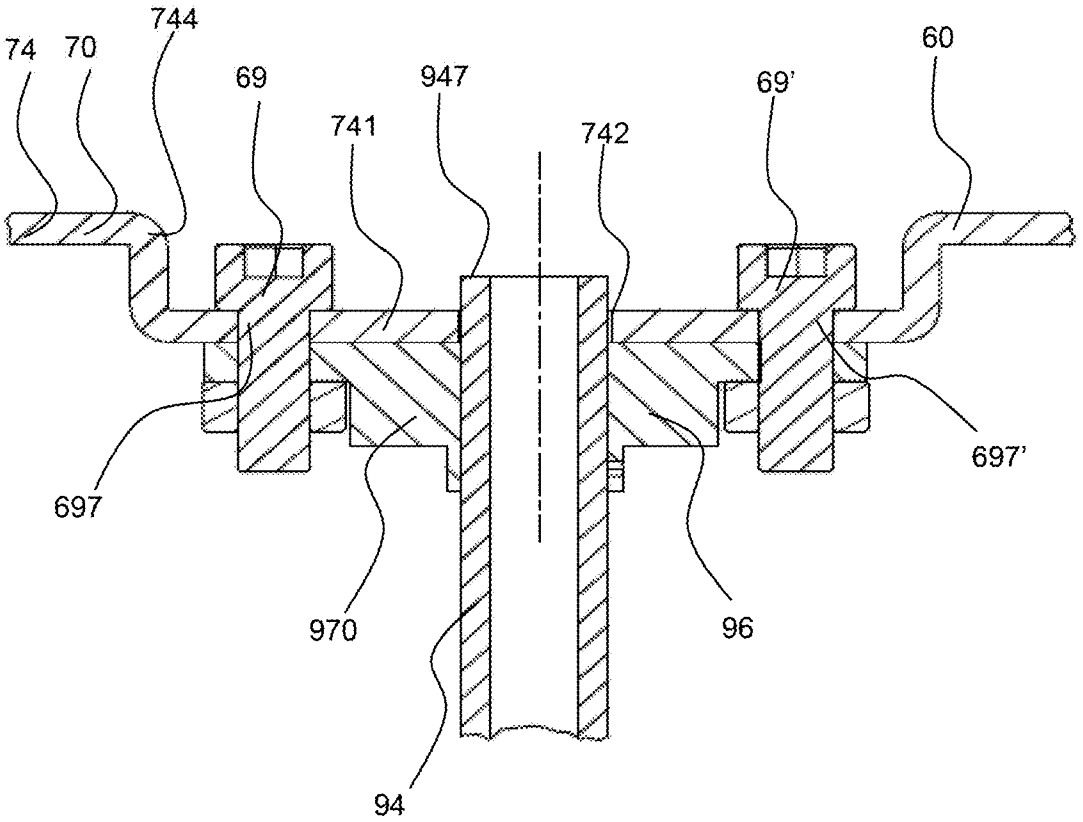
FIG. 11 shows a cross-sectional of the bearing coupling the foundation rod to the support arm plate of the poster mounting frame.

As shown in FIG. 11, the foundation rod 94 extends through the support arm rod coupling 742, an aperture in the support arm plate 741, and the stator-rotor coupling assembly 96, which comprises bearing plate 966, secures the poster mounting frame 70 to the foundation rod 94.

Figure 12:
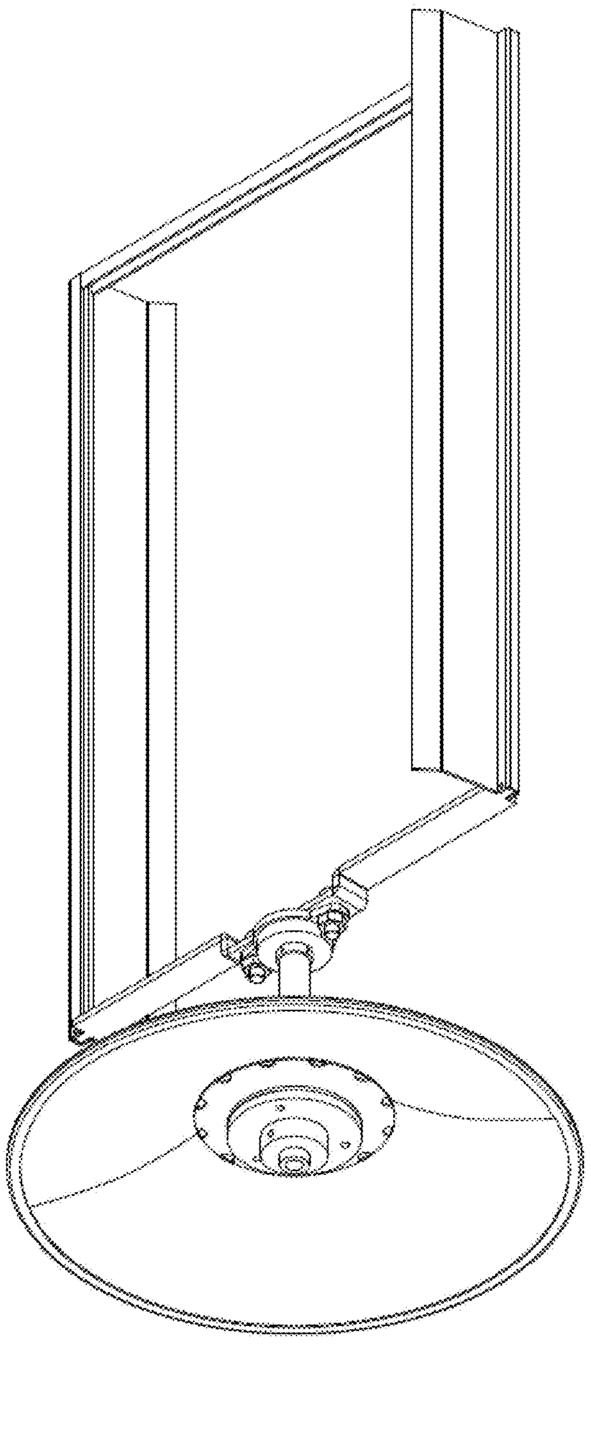
FIG. 12 shows a bottom perspective view of the wind-driven poster display system.

FIG. 12 shows a bottom perspective view of the wind-driven poster display system.

It will be apparent to those skilled in the art that various modifications, combinations, and variations can be made in the present invention without departing from the scope of the invention. Specific embodiments, features, and elements described herein may be modified, and/or combined in any suitable manner. Thus, it is intended that the present invention cover the modifications, combinations and variations of this invention provided they come within the scope of the appended claims and their equivalents.

What is claimed is:

1. A wind-driven poster display system comprising
a) a stator assembly comprising:
i) a foundation base; and
ii) a foundation rod extending from said foundation base;
b) a rotor assembly configured to rotate about the stator assembly and comprising of:
i) a poster mounting frame comprising:
a top extension having a top extension slot;
a bottom extension;
a left extension and a right extension, each extending from the bottom extension to the top extension on opposing sides of the poster mounting frame to form a window in said poster mounting frame to receive a poster therein, and wherein each of the left extension and right extension comprise a U-channel to retain a side of said poster;
ii) a wind-capture mechanism comprising:
a wing blade extending from each of the left extension and right extension, in opposing directions from the poster mounting frame; and
c) a stator-rotor coupling assembly configured between the stator assembly and rotor assembly comprising a bearing portion that enables the rotor to rotate about the stator assembly;
wherein the wing blades are configured to create a rotational force on the poster mounting frame when wind blows across the wind-driven poster display to cause the poster mounting frame to rotate about the stator assembly; and
wherein each of the wing blades comprises a first extension portion extending from the poster mounting frame and a second extension portion extending from the first extension portion at a second offset angle that is less than 180 degrees.

2. The wind-driven poster display system of claim 1, wherein the wing blades extend at a first offset angle of between 30 degrees and 120 degrees from the width axis of the poster mounting frame.

3. The wind-driven poster display system of claim 2, wherein the first extension portion is longer than the second extension portion by at least 25%.

4. The wind-driven poster display system of claim 1, wherein the first extension portion is longer than the second extension portion by at least 25%.

5. The wind-driven poster display system of claim 1, wherein the U-channel of each of the left extension and right extension are a monolith with the respective wing blade extending therefrom.

6. The wind-driven poster display system of claim 1, wherein the poster mounting frame has a height of at least 50 cm.

7. The wind-driven poster display system of claim 6, wherein the poster mounting frame has a width of at least 35 cm.

8. The wind-driven poster display system of claim 1, wherein the left extension and the right extension of the poster mounting frame are made of metal.

9. The wind-driven poster display system of claim 1, wherein the foundation base of the stator assembly has a circular shape.

10. A wind-driven poster display system comprising:
a) a stator assembly comprising:
i) a foundation base; and
ii) a foundation rod extending from said foundation base;

b) a rotor assembly configured to rotate about the stator assembly and comprising of:
i) a poster mounting frame comprising:
a top extension having a top extension slot;
a bottom extension;
a left extension and a right extension, each extending from the bottom extension to the top extension on opposing sides of the poster mounting frame to form a window in said poster mounting frame to receive a poster therein, and wherein each of the left extension and right extension comprise a U-channel to retain a side of said poster;
ii) a wind-capture mechanism comprising:
a wing blade extending from each of the left extension and right extension, in opposing directions from the poster mounting frame; and
c) a stator-rotor coupling assembly configured between the stator assembly and rotor assembly comprising a bearing portion that enables the rotor to rotate about the stator assembly;
wherein the wing blades are configured to create a rotational force on the poster mounting frame when wind blows across the wind-driven poster display to cause the poster mounting frame to rotate about the stator assembly;
wherein the stator-rotor coupling assembly comprises a bearing comprising:
a bearing plate;
a bearing shaft-sleeve portion; and
wherein said bearing portion is configured between said bearing plate and said bearing shaft-sleeve portion to allow the bearing shaft-sleeve portion to rotate with respect to the bearing plate.

11. The wind-driven poster display system of claim 10, wherein the bearing is a pillow block bearing.

12. The wind-driven poster display system of claim 11, wherein the bearing plate comprises a bearing plate aperture for receiving a rotor-stator fastener to secure the bearing to the poster mounting frame.

13. The wind-driven poster display system of claim 12, wherein the bearing shaft-sleeve portion comprises a bearing shaft-sleeve aperture to receive a fastener therethrough to secure the bearing shaft-sleeve portion to the stator assembly.

14. The wind-driven poster display system of claim 10, wherein the bearing shaft-sleeve portion comprises a bearing shaft-sleeve aperture to receive a fastener therethrough to secure the bearing shaft-sleeve portion to the foundation rod.

15. A wind-driven poster display system comprising
a) a stator assembly comprising:
i) a foundation base; and
ii) a foundation rod extending from said foundation base;
b) a rotor assembly configured to rotate about the stator assembly and comprising of:
i) a poster mounting frame comprising:
a top extension having a top extension slot;
a bottom extension;
a left extension and a right extension, each extending from the bottom extension to the top extension on opposing sides of the poster mounting frame to form a window in said poster mounting frame to receive a poster therein, and wherein each of the left extension and right extension comprise a U-channel to retain a side of said poster; and
ii) a wind-capture mechanism comprising:
a wing blade extending from each of the left extension and right extension, in opposing directions from the poster mounting frame;
each of the wing blades comprising:
a first extension portion extending from the poster mounting frame at a first offset angle of between 30 degrees and 120 degrees from the width axis of the poster mounting frame; and
a second extension portion extending from the first extension portion at a second offset angle that is less than 180 degrees;
wherein the first extension portion is longer than the second extension portion by at least 25%; and
c) a stator-rotor coupling assembly configured between the stator assembly and rotor assembly comprising a bearing portion that enables the rotor to rotate about the stator assembly;
wherein the wing blades are configured to create a rotational force on the poster mounting frame when wind blows across the wind-driven poster display to cause the poster mounting frame to rotate about the stator assembly.

16. The wind-driven poster display system of claim 15, wherein the stator-rotor coupling assembly comprises a bearing comprising:
a) a bearing plate; and
b) a bearing shaft-sleeve portion;
wherein said bearing portion is configured between said bearing plate and said bearing shaft-sleeve portion to allow the bearing shaft-sleeve portion to rotate with respect to the bearing plate.

17. The wind-driven poster display system of claim 15, further comprising a light device coupled to at least one of the wing blades to illuminate a poster retained in the poster mounting frame.

18. The wind-driven poster display system of claim 17, further comprising a photovoltaic cell coupled to the rotor assembly to power the light device.

* * * * *